US008806208B2

(12) United States Patent
Cheng et al.

(10) Patent No.: US 8,806,208 B2
(45) Date of Patent: Aug. 12, 2014

(54) APPARATUSES AND METHODS FOR ENABLING A USER TO CONSUME PROTECTED CONTENTS OF A CONTENT PROVIDER

(75) Inventors: Yi Cheng, Sundbyberg (SE); Ulf Björkengren, Bjärred (SE); Daniel Catrein, Würselen (DE); Frank Hartung, Herzogenrath (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 5 days.

(21) Appl. No.: 13/577,756

(22) PCT Filed: Feb. 11, 2010

(86) PCT No.: PCT/SE2010/050164
§ 371 (c)(1),
(2), (4) Date: Oct. 23, 2012

(87) PCT Pub. No.: WO2011/099903
PCT Pub. Date: Aug. 18, 2011

(65) Prior Publication Data
US 2013/0054970 A1 Feb. 28, 2013

(51) Int. Cl.
*H04L 29/06* (2006.01)
(52) U.S. Cl.
USPC ........... 713/171; 713/167; 713/189; 713/193; 726/26; 726/27; 726/28; 726/29; 726/30; 380/28; 709/231; 709/247
(58) Field of Classification Search
USPC .................. 709/231, 247; 713/167, 189, 193; 726/26–30; 380/28
See application file for complete search history.

(56) References Cited

U.S. PATENT DOCUMENTS

2007/0022306 A1* 1/2007 Lindsley ...................... 713/193
2009/0300775 A1* 12/2009 Chu et al. ..................... 726/27
2010/0169222 A1* 7/2010 Qawami et al. .............. 705/59

FOREIGN PATENT DOCUMENTS

KR    20090032216 A    4/2009
WO    2007114657 A1    10/2007

OTHER PUBLICATIONS

Zhang, J. et al. "An Efficient Right-granting Model with Hierarchical Group Rights for Large-scale Content Distribution." IMACS Multiconference on Computational Engineering in Systems Applications (CESA), pp. 1228-1235, Oct. 4-6, 2006, Beijing, China.
Open Mobile Alliance. "DRM Specification—SCE Extensions." Candidate Version 1.0, May 26, 2009, Open Mobile Alliance OMA-TS-SCE_DRM-V1_0-20090526-C, pp. 1-61.

* cited by examiner

*Primary Examiner* — Hadi Armouche
*Assistant Examiner* — Hee Song
(74) *Attorney, Agent, or Firm* — Coats & Bennett, P.L.L.C.

(57) ABSTRACT

The embodiments of the present invention relate to apparatuses, in terms of a client device (110) and a server (120) and to methods in the client device (110) and in the server (120) respectively for enabling a user to consume content provided by a content provider. According to the method in the client device (120) the method comprises: assembling a request for rights for consuming a content and indicating in the request which content to consume; determining if an upgrade key, associated with the content, is present in the client device; including, in such a case, in the request, an identifier of the upgrade key that is associated with the content, sending the request to the content provider; receiving, a response comprising an encrypted rights object; decrypting the encrypted rights object and starting to use the rights object for consuming the content.

24 Claims, 8 Drawing Sheets

APPARATUSES AND METHODS FOR ENABLING A USER TO CONSUME PROTECTED CONTENTS OF A CONTENT PROVIDER

TECHNICAL FIELD

The present invention relates generally to the field of telecommunication systems, and, more specifically, to apparatuses and to methods for enabling a user to acquire and consume contents protected by a content provider.

BACKGROUND

A content provider usually protects contents such as music, movies, pictures, games etc. prior to transmission to users to avoid the unauthorized use, duplication and distribution of the content. Protection is generally performed using encryption and only the users that have the right decryption key(s) are able to decrypt and to consume the content. In order to allow flexibility in the way content is distributed, rights objects are used to define how content is allowed to be used. For example, a rights object might define the time period during which the user i.e. the receiver may use the content. Typically, the rights object will contain and protect the keys used to decrypt the provided content. An authorized user e.g. a previous purchaser is allowed to consume the content since he or she already has the correct rights object and the right key(s). It often occurs that the authorized user desires or needs to extend and/or upgrade the rights object. Typical causes include the following cases:

- The user wants to get more permissions, e.g. to be able to print a picture in addition to displaying it on a screen.
- The user wants to view the content a few times more or for a longer time period. For subscription based services, this could imply subscription renewal.
- The user wants to get access to a new version of the content when available (e.g. video with higher quality, software with enhanced functionalities, game with new features, etc).

Most systems such as digital right management (DRM) systems and/or conditional access (CA) systems handle the above cases by issuing a new rights object with requested rights for the same or new content i.e. in case of new content version. The new rights object is normally independent of the old one.

Secure Content Exchange (SCE) specified by Open Mobile Alliance (OMA) provides support for upgrade of rights object as specified in *OMA-TS-SCE-DRM, DRM Specification—SCE Extensions*, available at URL:http//www.openmobilealiance.org. In the specifications it is described that a user can upload the existing rights object to the rights issuer, specify the desired changes and then get back an upgraded rights object, which replaces the previous one i.e. the old one must be removed from the user's device before the new one can be installed. In some cases it can be expected that multiple users belonging to a group or domain will request the same upgrade. One example is that subscribers to a TV channel need to get the new channel key when it changes without undesired interruption. Another example is users requesting a new version of content/software/game they already have. For that purpose, the provider needs to know whether a user has previously consumed content and/or purchased rights. One reason is that the provider wants to offer e.g. a "bonus system" to previous users. The provider can keep some records in a user database and manage that database. A drawback with this is that the provider who offers a large variety of content/software etc. needs a large user database and thus the management overhead is not neglectable.

A solution to the problem above could be to request users to present their existing rights objects to the provider or to the rights issuer so that no database records are necessary. However, a drawback is that the protocol used for that purpose is complex since the provider needs to verify that a user really owns the rights object. Otherwise there is a risk that a cheating user gets upgrade. The complexity of the protocol is further increased due to the need of securely conveying the current state of the rights object e.g. how may plays left, remaining duration for content rendering etc., to the provider.

Sometimes the upgrade need is the same for multiple subscribers or users that already belong to a common domain or group. In this case, the provider would issue a rights object or an upgraded rights object that is usable by the multiple users of the domain or group. Most systems e.g. DRM and CA systems support domain rights object but this requires the users/devices to joint the domain. If we consider thousands or even millions of people who have purchased a popular content e.g. a game, software, a TV channel etc., each has to run the join-domain protocol in order to get the domain group key. Management of such a large domain is difficult due to the complex protocol and/or due to large management overhead and security issues.

SUMMARY

It is thus an object of the exemplary embodiments of the present invention to address at least the above mentioned problems and to provide apparatuses and methods that allow a simple way of handling rights objects without the need for complex protocols or need for the provider to keep a lot of records in its database, thereby improving/facilitating rights distribution to users desiring to consume content and to upgrade contents provided by the content provider without jeopardising or compromising security.

According to a first aspect of exemplary embodiments of the present invention, the above stated problems are solved by means of a method performed in a client device for enabling at least one user to consume content provided by a content provider. According to this aspect, the method comprises: assembling, in one or several messages, a request for rights for consuming a content and indicating in the request which content to consume; determining if an upgrade key associated with the content is present in the client device; including in the request message, in the case the upgrade key is present in the client device, an identifier of the upgrade key that is associated with the content; sending the request including the identifier of the upgrade key, to the content provider; receiving, from the content provider, a response comprising a rights object encrypted by using at least the upgrade key; decrypting the encrypted rights object and starting to use the rights object for consuming the content.

In the case the upgrade key is absent in the client device, the method, according to an exemplary embodiment of the present invention, comprises sending the request, i.e. without an identifier of the upgrade key, to the content provider; receiving, from the content provider, a response comprising a rights object encrypted using a client device/user's public key, the received rights object comprising an upgrade key that is associated with the content; decrypting the rights object using the client device/user's private key; and starting to use the rights object for consuming the content.

According to another aspect of exemplary embodiments of the present invention, the above stated problems are solved by means of a method in a server of a content provider, for enabling at least one user to consume content provided by the content provider. The method comprising: receiving, from a client device, a request for rights for consuming a content, the request indicating which content to consume; determining if an identifier of an upgrade key is present in the request; verifying, in the case an identifier of an upgrade key is present in the request, that the identifier of the upgrade key is associated with the content; retrieving the upgrade key from a repository; generating a rights object; encrypting the rights object by using at least the retrieved upgrade key; and sending, to the client device, a response comprising the encrypted rights object for enabling the client device to decrypt the rights object and to start to use the rights object for consuming the content.

In the case an identifier of an upgrade key is absent in the request, the method, in the server, comprises, according to an exemplary embodiment of the present invention, generating an upgrade key that is associated with the content; storing the generated upgrade key in a repository; generating a rights object; including, in the rights object, the generated upgrade key and an identifier of the generated upgrade key; encrypting the rights object by using a client device/user's public key; sending, to the client device, a response comprising the encrypted rights object for enabling the client device to decrypt the rights object and to start to use the rights object for consuming the content.

According to a further aspect of exemplary embodiments of the present invention, the above stated problems are solved by means of a client device for enabling at least one user to consume content provided by a content provider capable in operating in a digital rights management system. The client device comprises an assembling circuit configured to assemble in at least one message, a request for rights for consuming a content and is further configured to indicate in the request which content to consume. The client device further comprises a determination circuit configured to determine if an upgrade key associated with the content is present in the client device, and the assembling circuit is adapted to include in the request, the identifier of an upgrade key that is associated with the content; in the case the upgrade key is present in the client device. The client device further comprises a transmitter circuit configured to send the request comprising the identifier of the upgrade key, to the content provider, in the case the upgrade key is present in the client device. The client device further comprises a receiver circuit configured to receive, from the content provider, a response comprising a rights object (RO) encrypted by using at least the upgrade key, in the case the upgrade key is present in the client device. The client device further comprises a decryption circuit configured to decrypt the encrypted RO and further comprises a processing circuit configured to use the RO for consuming the content.

According to a further aspect of exemplary embodiments of the present invention, the above stated problems are solved by means of a server of a content provider, for enabling at least one user to consume content provided by the content provider capable in operating in a digital rights management system. The server comprises a receiver circuit configured to receive, from a client device, a request for rights for consuming a content, the request indicating which content to consume. The server further comprises a determination circuit configured to determine if an identifier of an upgrade key is associated with the content. The server further comprises a verification circuit adapted to verify the identifier of the upgrade key is associated with the content, in the case the identifier of an upgrade key is present in the request. The server further comprises a retrieving circuit configured to retrieve the upgrade key from a repository; in the case the identifier of the upgrade key is present in the request. The server further comprises a generating circuit configured to generate a rights object (RO). The server further comprises an encryption circuit configured to encrypt the RO by using at least the retrieved upgrade key. The server further comprises a transmitter circuit configured to send, to the client device, a response comprising the encrypted RO for enabling the client device to decrypt the RO and to start to use the RO for consuming the content The exemplary embodiments of the present invention further relates to a computer program product comprising program instructions for causing a computer to perform the method steps of the present invention.

An advantage of the exemplary embodiments of the present invention is to simplify management or handling of rights objects and upgrade of rights objects.

Another advantage of the exemplary embodiments of the present invention is to make it possible to realise, in a simple and secure way, that only users who have previously purchased a rights object can upgrade it.

A further advantage of the exemplary embodiments of the present invention is to allow content providers to not necessarily keep large databases over all records of all users.

Yet another advantage of the exemplary embodiments of the present invention is to simplify rights distribution to group of users.

Still other advantages, objects and features of the embodiments of the present invention will become apparent from the following detailed description in conjunction with the accompanying drawings, attention to be called to the fact, however, that the following drawings are illustrative only, and that various modifications and changes may be made in the specific embodiments illustrated as described within the scope of the appended claims. It should further be understood that the drawings are not necessarily drawn to scale and that, unless otherwise indicated, they are merely intended to conceptually illustrate the structures and procedures described herein.

ABBREVIATIONS

ADLS Asymmetric Digital Subscriber Line
Cdma2000 Code Division Multiple Access 2000
CEK Content Encryption Key
CA Conditional Access
DRM Digital Rights Management
GSM Global System for Mobile Communications
IP Internet Protocol
LTE Long Term Evolution
MAC Message Authentication Code
OMA Open Mobile Alliance
PDA Personal Digital Assistant
PC Personal Computer
REK Rights Encryption Key
RI Rights Issuer
RO Rights Object
ROAP Rights Object Acquisition Protocol
SCE Secure Content Exchange
UE User Equipment
UK Upgrade Key
UMTS Universal Mobile Telecommunications system
WLAN Wireless Local Area Network
WiMax Worldwide interoperability for Microwave Access

DETAILED DESCRIPTION

In the following description, for purposes of explanation and not limitation, specific details are set forth such as particular architectures, scenarios, techniques, etc. in order to provide thorough understanding of the present invention. However, it will be apparent from the following that the present invention and its embodiments may be practiced in other embodiments that depart from these specific details.

The exemplary embodiments of the present invention are described herein by way of reference to particular example scenarios. In particular the invention is described in a non-limiting general context in relation to a DRM system, in a telecommunications network, wherein a content provider usually protects contents such as music, movies, pictures, games, software etc. prior to transmission to client devices of users and wherein rights objects associated to the contents are used to define how contents are allowed to be used. The DRM system can be a fully-fledged rights management system and/or a CA-based system or any suitable system where rights objects or licenses are used in conjunction to contents to be sent or distributed to client devices. The content provider is such system(s) are here considered maintaining server(s) which can be dedicated for content and rights provision or can be centralised and handling a plurality of services not restricted to content. As an example, a server can handle content provision and also short message service (SMS) and/or wireless application protocol (WAP) and/or hypertext transfer protocol (HTTP) and/or Messaging and/or charging etc.

Figure 1:
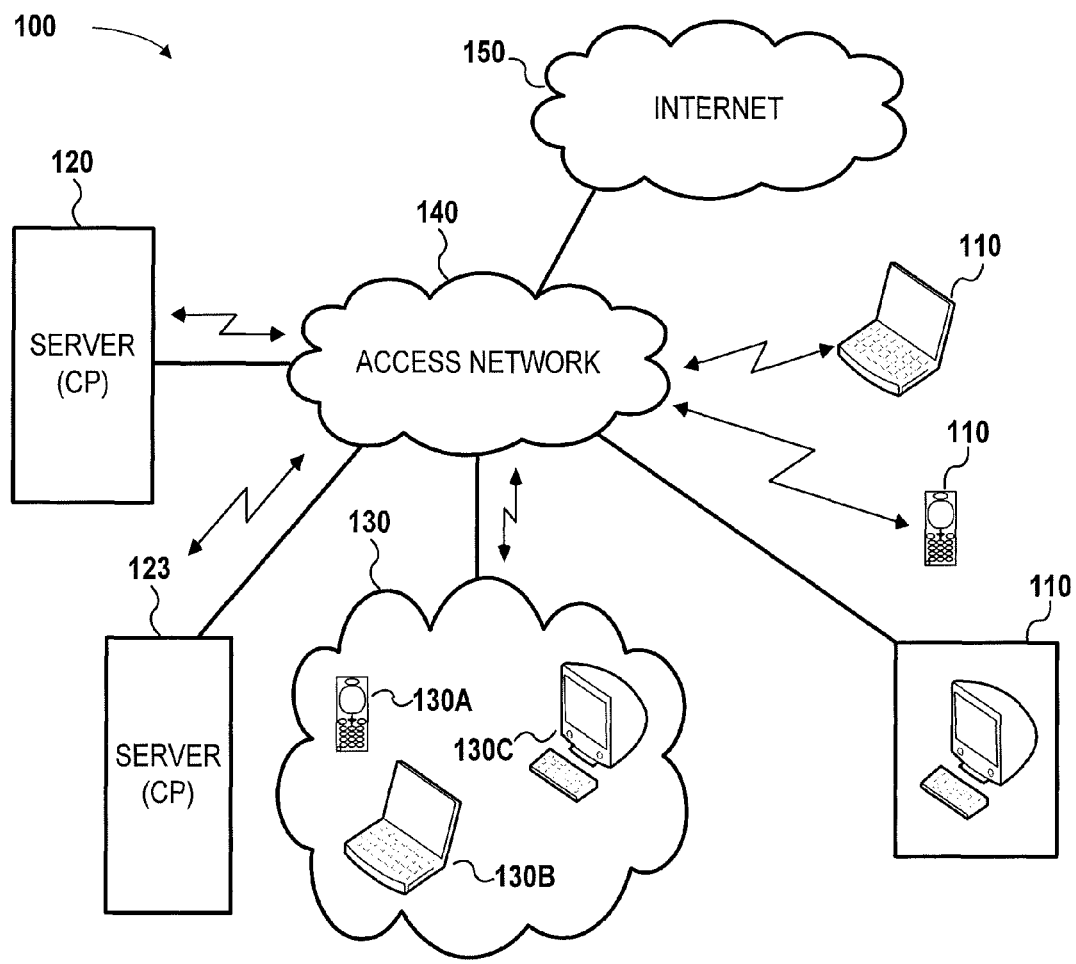
FIG. 1 is a simplified diagram depicting a telecommunications network, including client devices and a server of a content provider, wherein the exemplary embodiments of the present invention may be applied.

Referring to FIG. 1 there is illustrated a simplified diagram depicting a content delivery DRM system in a telecommunication network 100 comprising client devices 110; one or more servers 120 of one or several content providers (CP); an access network (AN) 140 connected to the Internet 150, and a group or a domain 130 including client devices 130A, 130B, 130C. The number of client devices in the group 130 is not restricted to three devices i.e. it can include fewer or larger number of client devices.

The access network 140 can be fixed-line access network e.g. ADSL or any suitable internet IP-based network; a cable TV network; a mobile access network such as GSM, UMTS, cdma200, LTE, WiMax, WLAN and/or satellite access network etc. The exemplary embodiments of the present invention are not restricted to any particular type of access network.

Referring back to FIG. 1, a client device 110, 130A-130C can be a user equipment (UE), a mobile terminal, a PDA, a laptop, a PC, a TV, a set-top box, a private server or any suitable device capable in receiving and consuming content provided by the content provider 120 in the context of the exemplary embodiments of the present invention. The content provider or generally the server 120 often provides its users choice among a variety of services and/or contents. This allows the users to tailor the services they acquire from the server 120 to suit their individual needs. As an example, in the context of games, users can choose among levels of the game. In the context of TV services, users can choose among premium channels, pay-per-view and on-demand programming. In the context of music, the users can choose to acquire a single track or a whole album. To facilitate this variety, a content provider typically encrypts some or all of their content and only allows authorized client devices to decrypt content corresponding to the services the user is subscribed to or the user purchased.

In order to allow flexibility in the way content is distributed, rights objects are, as previously described, used to define how content is allowed to be used. For example, a rights object might define the time period during which the user i.e. the receiver may use the content. The rights objects include and protect the keys used to decrypt the provided content. An authorized user e.g. a previous purchaser or a previous subscriber is allowed to consume the content since he or she already has the rights object and the right key.

Independently of the content that the server 120 provides to the client device(s), a right object (RO) comprises, according to the embodiments of the present invention, an upgrade key (UK). In other words, when the server 120 issues a RO for a content to a stand-alone client device or to a client device belonging to a group, a UK is included in the RO for which future upgrades can be foreseen. When the client device 110 or the user of the client device requests an RO upgrade, a new RO is generated and protected by using the UK. The new RO may itself include a new upgrade key. In the following and in conjunction with FIGS. 2-4, different scenarios will be described in accordance with exemplary embodiments of the present invention.

Figure 2:
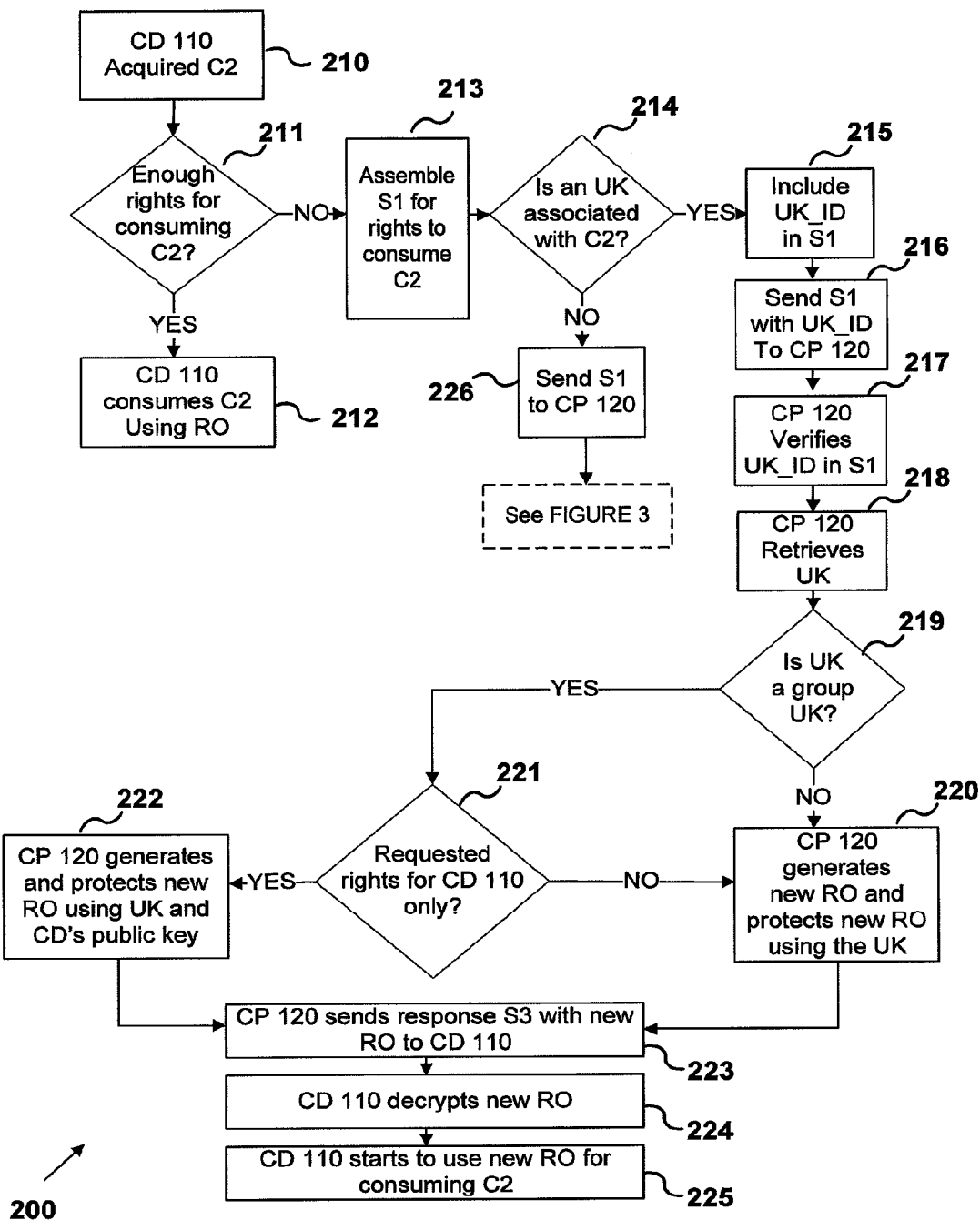
FIG. 2 is a flow diagram depicting a scenario wherein a user's client device, being a previous content consumer, requests additional rights from a content provider, according to an exemplary embodiment of the present invention.

FIG. 2 illustrates a flow diagram depicting a scenario 200 wherein a user's client device 110, being a previous content consumer, requests additional rights from the server 120 of a content provider (CP), according to an exemplary embodiment of the present invention. In this scenario, the client device 110 is considered to be a previous consumer of a content C1 or a previous purchaser of the content C1 or a current subscriber for the content C1. In this case, a RO is present in the client device 110 and the RO comprises an UK which is identified by an identifier, denoted here UK_ID. It is further considered the case where the client device 110 has downloaded or purchased or generally acquired, in step 210, a content C2 which the client device (CD) wishes to consume or play. For easier understanding of the scenario in FIG. 2, the content C2 is assumed to be a new version of content C1. When the client device 110 attempts, in step 211, to play or consume the content C2, an agent e.g. a DRM agent in the client device 110 locates the RO that is associated with the content C2. In case the rights are sufficient, the client device 110 starts, in step 212, to consume the content C2 by using the existing RO. For example, the rights are considered sufficient when the RO allows the user to play/consume C2 for a maximum of X times, where X can take any value. Assume now that the user has already played/consumed C2 (X−1) times and now wants to play/consume for the Xth time. The user is allowed to do so since the rights are sufficient. It should be noted the RO may also include the UK and/or the UK_ID that is associated with C2.

But in case the rights are insufficient, the client device 110 or the DRM agent assembles, in step 213, in at least one message, a request denoted here S1 for rights for consuming the content C2 and indicates in the request S1 which content i.e. C2 to consume or play. For example, in case the rights are insufficient, the user of the client device 110 is informed of the situation via e.g. a pop-up window indicating that in order to consume the content C2 rights or more rights are required and the user is asked whether the user wants to acquire the required rights. If the user answers yes, client device 110 or the DRM agent of the client device 110 assembles the request 51. The client device 110 or the DRM agent further determines, in step 214, if an UK associated with the content C2 is present in the client device. In this case, the DRM agent includes, in step 215, an identifier of the UK i.e. the UK_ID that is associated with the content in the request S1 and sends, in step 216, the request S1 comprising UK_ID to the content provider or to the server 120 of the content provider. The content provider has thus a role of a rights issuer (RI). For example, the user of the client device 110, upon answering yes, is directed to e.g. the RI portal to which S1 is sent to, where the user can specify the rights the user wants to acquire for the content C2 and makes payment if necessary. It should be noted that the content provider or the RI can send a rights object acquisition trigger message to the DRM agent of the client device 110 prior to the request S1 be sent to the content provider. Referring back to FIG. 2, when the content provider or the server 120 receives the request S1 comprising the UK_ID and indicating which content the user wants to consume, the content provider or server 120 determines or verifies, in step 217, if a UK_ID is present in the request S1, which is the case in the scenario. The server 120 then verifies that UK_ID is associated with the content C2. Since the UK_ID, as previously mentioned, is associated with content C2, the server 120, in step 218, retrieves the UK from a repository e.g. a key repository, and makes sure that the UK is associated to the content in question i.e. to C2. This will guarantee that the received UK_ID is associated with the retrieved UK which in turn is associated with the requested content C2. The (key) repository can be an integral part of the server 120 or can be a separate unit e.g. a memory unit available to the server 120 via an interface which can be wireless or fix. In other words, the content provider does not need to keep the repository in the same location as the server 120. One reason for that is to further increase security so that if a malicious user gets access to server 120, the malicious user cannot access the repository and steel the keys associated with the contents in the server 120.

Referring back to FIG. 2, when UK is retrieved from the repository, the server 120 determines, in step 219, if the UK is a group UK i.e. if the user belongs to a domain or a group. If the UK is not a group UK, a new RO is constructed or generated, in step 220, by the content provider or by the server 120, containing the rights requested by the client device 110. If the UK is a group UK, the server 120 determines, in step 221, if the requested rights are intended for the client device only and if this is the case, a new RO is generated and protected, in step 222, by the content provider or by the server 120. The new RO which is protected, in step 222, comprises the rights requested by the client device 110. The protection is performed by means of encryption i.e. the new RO is encrypted by using the retrieved group UK and by using the client device/user's 120 public key. If the UK is a group UK and a new RO is not intended for the user only, the content provider or server 120 generates and protects, in step 220, the new RO containing the rights requested by the client device 110. In step 220, the new RO is protected through encryption using the retrieved UK.

It should be mentioned that, according to the embodiments of the present invention, the UK (user specific UK or group UK) can be viewed as a new element introduced in the prior art RO structure. The new element contains the UK which can be encrypted and/or it can contain a reference to the UK and the UK_ID and optionally UK specific constraints such as validity time period. In case the UK is encrypted, the UK can be encrypted using a rights encryption key (REK) in the same way as the prior art content encryption key (CEK) is encrypted. Furthermore, the retrieved UK can be used to encrypt the REK and a prior art message authentication code (MAC) key.

Note however, that although the prior art RO structure is known as well as REK and MAC key, the prior art RO structure does not comprises a UK according to the embodiments of the present invention.

The server 120 or the RI may also protect the REK and the MAC key in the new RO by using the UK. This can be performed in two different ways:

Option 1: instead of the client device/user's public key or the DRM agent's public key, or in case of a new group RO, the UK is used to encrypt REK and MAC key.

Option 2: the REK and MAC key are encrypted twice, first with the UK then with the client device/user's 120 public key or the DRM agent's public key or domain key in case of domain RO.

For user specific UK or for individual UK, Option 1 above is enough because only the intended client device knows it's specific UK. In other words, no one of the other client devices is able to decrypt the REK and in turn decrypt the CEK. This also means that the encryption and decryption is faster using Option 1 than using Option 2. Note however, that Option 2 may be applied instead of Option 1.

For group UK, Option 1 makes the new RO usable by any client device in the group who has acquired or purchased the content. This may be desirable in some cases. For example, when used with Option 1, group UK becomes very similar to domain Key. But the delivery of group UK is piggybacked in normal RO acquisition, not requiring any particular join-domain protocol. Piggybacked, in this context, means the UK is embedded in the RO when the RO is acquired. While for domain key, it is delivered separately, using a particular protocol. I.e. for domain RO, two steps are needed: first join domain, then RO acquisition. For UK, only the acquisition step is needed In some cases, group UK with Option 1 can be used to simplify rights distribution. For example, consider a software/game provider who offers free upgrade to users who buy the current version of software/game. For each buyer, at the initial rights acquisition, a so called rights object acquisition protocol (ROAP) is carried out and the acquired RO is protected with the client device/user's public key or the DRM Agent's public key. The RO contains an UK that is common for all buyers. Later, when a new version of the software/game becomes available, the server or the content provider or the RI generates a new RO that gives a basic set of rights. The RI protects the RO by using the common UK, so all users that have purchased the previous version and have knowledge of the common UK can consume the RO. Users can acquire the new RO using ROAP. But since there is no need to generate RO for each user, the content provider is able to process the acquisition requests faster e.g. for popular software/game, a large number of requests may come shortly after the release announcement. The content provider can further reduce work load even more by publishing the RO on its web portal for free download. An exemplary scenario illustrating the above will be presented in conjunction to FIG. 4.

Referring back to FIG. 2, when the server 120 generates and protects the new RO in step 220 or step 222, the server 120 is configured, in step 223, to send the new RO to the client device 110 or to the DRM agent of the client device 110 in a RO response message, denoted S3 in FIG. 2. According to an exemplary embodiment of the present invention, the server 120 can include an updated UK in the new RO before sending it to the client 120. An advantage of including an updated UK in the RO is that the update UK provides enhanced security. For instance, for group UK, if a previous subscriber/user cancels his/her subscription, an updated UK should be used otherwise that user will still have access.

When the client device 110 or DRM agent receives the new RO, a decryption process is performed, in step 224, at the client device 110. In case the UK is not a group UK, the new RO is decrypted using the UK. In this case, the UK is unique for the client device 110. In case the UK is a group UK and the new RO is intended for the user only, both the group UK and the client device/user's private key are used for decryption of the RO. In this case only client device 110, belonging to a group or domain of client devices, purchased or acquired the content C2 i.e. the content is only intended for the client device 110 within the group. In case the UK is a group UK and the new RO is not intended for the user only, the group UK is used for decryption of the new RO since in this case the group UK is the same for all client devices who want to consume the same content C2 or who purchased the same content C2. It should be mentioned that the client device 110 can use the UK to recover the REK and MAC in the new RO. The client device 110 can verify the integrity of the RO and can decrypt a content encryption key (CEK) by using the REK. It should also be mentioned that the server 120 or the RI can, generate a new random UK i.e. the new random UK will be an updated UK which is included in the generated RO, as described above in accordance with an exemplary embodiment of the present invention. In this case, the structure of the RO comprises an element in it to put the updated UK. The updated UK can also be encrypted using REK prior to including it in the RO structure. Alternatively, the server 120 or the RI can re-use an existing key e.g. CEK or REK as the UK and can include a reference to that existing key in an element part of the RO structure.

Referring back to FIG. 2, when the decryption process has been performed, in step 224, the client device 110 or the user of the client device 110 can start, in step 225, to use the decrypted RO for consuming the content C2.

The scenario in conjunction with FIG. 2 clearly describes and illustrates how the UK can be used for upgrading a RO. The procedure of how and when payment of the content is performed is likely to vary from content provider to content provider and/or from content to content. In other words, the exemplary embodiments of the present invention are not restricted to any type of payment procedure. Note however that the content provider or server may require the client device to prove possession of the UK before issuing a new RO. This can be done via some additional exchange, for instance a challenge-response exchange when the client device calculates the response by using the UK, or a hash of it, is sent to the content provider or server or RI encrypted with a RI's public key.

As shown in FIG. 2 and according to an embodiment of the present invention in case the UK in step 214 is determined to be absent in the client device i.e. there is no UK associated with content C2 in the client device, the request S1 assembled in step 213 is, in step 226, sent to the content provider or server 120 as will be explained below in conjunction with a scenario 300 of FIG. 3.

The scenario 300 can be viewed as a scenario wherein the client device 110 is a first time consumer or a first time purchaser with no ROs present in the device 110 and thus no UK according to the embodiments of the present invention, or it could be that even if a RO with a UK is present in the client device 110, this UK is not associated with the desired C2.

Figure 3:
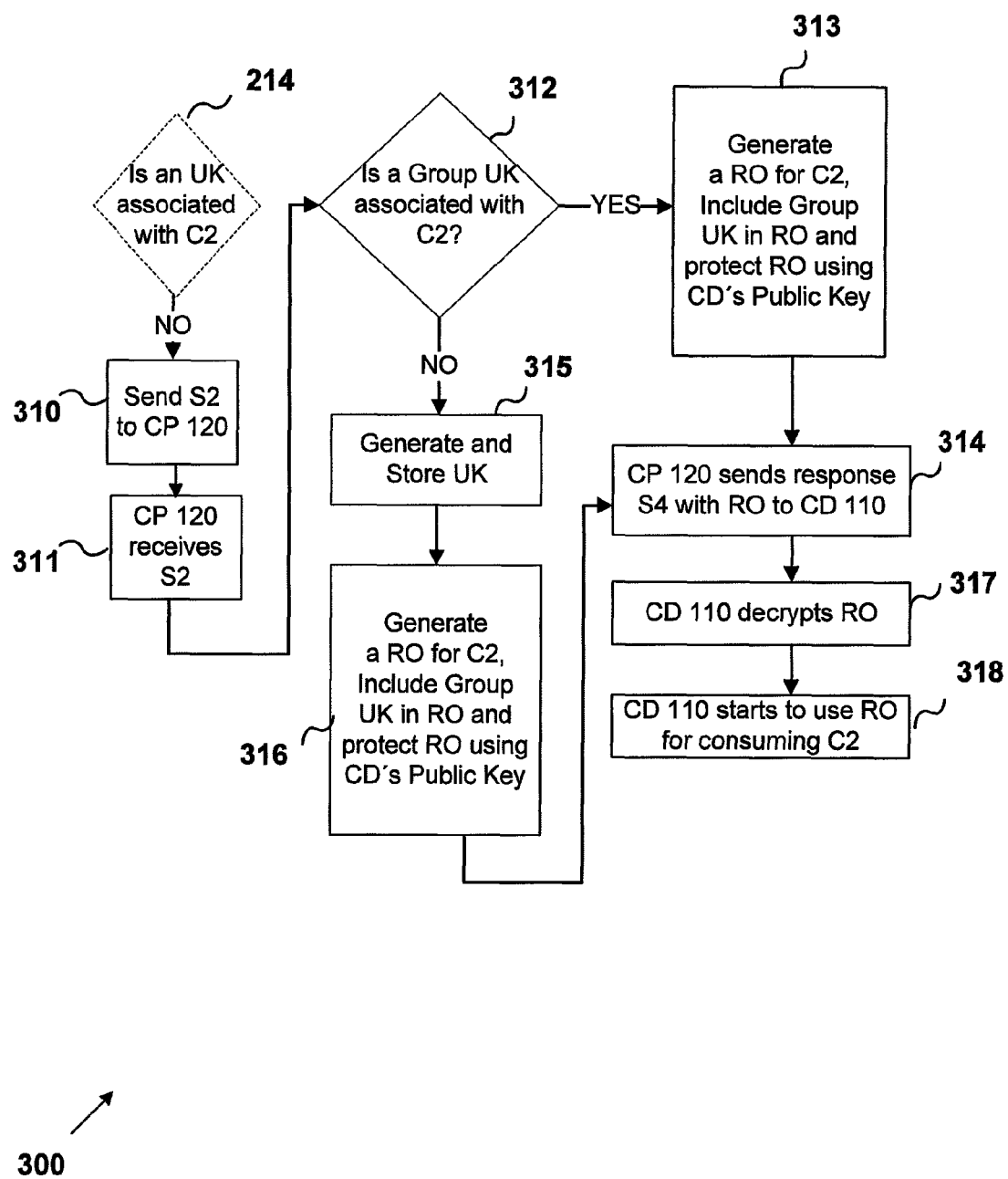
FIG. 3 is a flow diagram depicting a scenario wherein a user's client device, being a first time content consumer, requests contents from a content provider, according to another exemplary embodiment of the present invention.

For easier understanding of the scenario of FIG. 3, in step 310, corresponding to step 226 of FIG. 2, the assembled request S1 with no UK_ID is denoted S2. S2 is thus sent, in step 310, by the client device 110 to the server 120 or content provider or RI. As the server 120 receives, in step 311, S2, the server checks or determines, in step 312, if there is a group UK associated to C2 in the (key) repository and if this the case, the server 120 generates, in step 313, a RO which includes the group UK and protects/encrypts the RO using the client device/user's public key prior to sending, in step 314, the protected RO to the client device 110 in a response message S4.

In case there is no group UK associated to C2 in the (key) repository, the server 120 generates, in step 315, a UK, for the client device 110, that is associated with C2; stores the UK in the (key) repository and then, in step 316, generates a RO which includes the generated UK and protects/encrypts the RO using the client device/user's public key prior to sending, in step 314, the protected RO to the client device 110 in a response message S4. When the client device 110 or DRM agent receives the RO, a decryption process is performed, in step 317. In this step 317, the client device 110 decrypts the RO using the client device/user's private key. The client device 110 can now start, in step 318, to use the decrypted RO to consume content C2.

Furthermore, ROAP can be used to acquire the RO as previously discussed.

Figure 4:
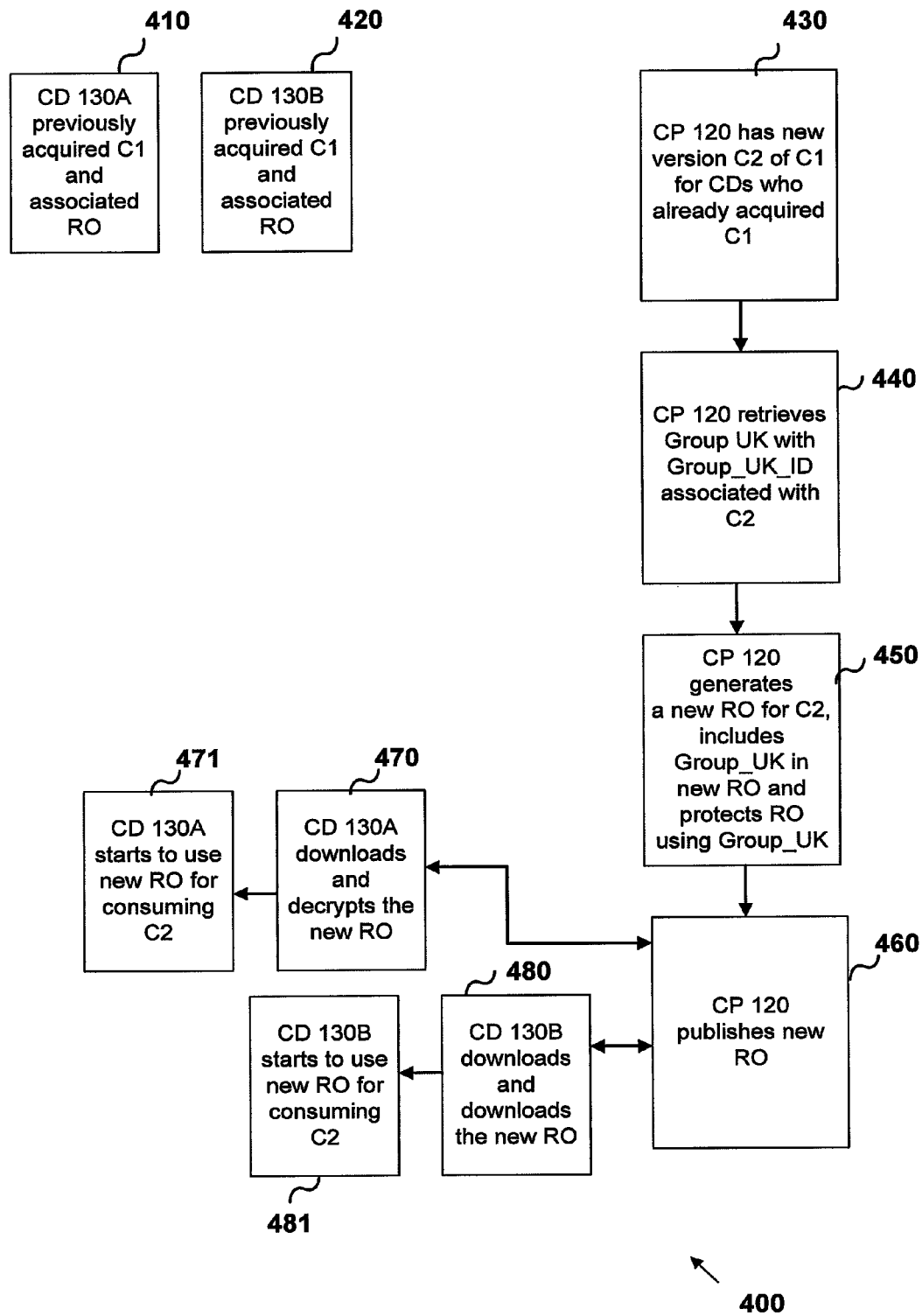
FIG. 4 is a flow diagram depicting a scenario wherein at least one client device belonging to a group requests contents from a content provider, according to an exemplary embodiment of the present invention.

Referring now to FIG. 4 there is illustrated a flow diagram depicting yet a further exemplary scenario 400 in accordance with an exemplary embodiment of the present invention. In this scenario it is considered a group case scenario meaning that a client device 130A belongs to a group, such as group 130 of FIG. 1, and this client device 130A is assumed to be a previous content consumer of content C1 of content provider or server 120. Furthermore, a further client device 130B belonging to same group 130 is also assumed to be a previous content consumer of content C1. Consider now an exemplary scenario where the server 120 has a new version or an upgraded version of C1, denoted C2, which the server 120 makes, in step 430, available to all subscribers belonging to group 130 who already acquired C1 and/or to all client devices who previously acquired C1. The new version of the content is denoted C2 in order to be consistent with the terminology in conjunction with previous FIGS. 2-3. In the scenario of FIG. 4, only client devices 130A and 130B of group 130 are considered previously acquirer of C1. It should be mentioned that the exemplary embodiments of the present invention are neither restricted to any particular content nor are they restricted to the way the content is acquired.

Referring back to FIG. 4, each one of client devices 130A-130B, in step 410 and step 420 respectively, are, according to the embodiments of the present invention, hosting a RO comprising a UK which is a group UK identified by an identifier, denoted Group_UK_ID. An RO as well as Group_UK_ID as associated with C1. The server 120 is configured, in step 440, to retrieve from a repository the group UK having identifier Group_UK_ID associated with C2 and in step 450, the provider generates a new RO with a set of rights and protects/encrypts the new RO with the group UK prior to publish, in step 460, the protected new RO. Client device 130A can subsequently download the protected new RO and decrypt it, in step 470, using the group UK. Thereafter, client device 130A can start, in step 471, to use the decrypted new RO to consume content C2. Similarly client device 130B downloads the protected new RO and decrypts it, in step 480, using the group UK. Thereafter, client device 130B can start, in step 481, to use the decrypted new RO to consume content C2. The new RO can also comprise an updated group UK (not shown in FIG. 4). The advantage of using a group UK is thus to simplify rights distribution by the content provider and to provide enhanced security. For instance, as previously described, for group UK, if a previous subscriber/user cancels his/her subscription, an updated group UK should be used otherwise that user will still have access.

Note again that the previously described encryption and description procedures regarding the use of REK, CEK and MAC are also applicable for the scenario shown in FIG. 4. The previously described Option 1 is applicable for the scenario depicted in FIG. 4. Furthermore, ROAP can be used to acquire the RO as previously discussed.

A further advantage with all the previously described embodiments of the present invention is that content provider does not necessarily key a database over all client devices belonging to a group or not. A secure (key) repository is however required to enable the server to store UK or and/or group UKs and any necessary keys. But the management of such a repository is much less complex than management of all records of client devices and their users etc. which requires the running of complex protocol(s) as previously described.

Yet a further advantage with the previously described embodiments is that only client devices that have previously acquired a content associated with a RO can upgrade it, likely with a discount price or benefits. As an example, users or client devices that previously purchased rights for consuming content associated with a RO can get a discount for additional rights. For instance, to be able to play a certain game level, an existing client device or user who e.g. bought rights to play lower levels before needs to pay only a small amount e.g. 1 dollar, while a new user or a new client device will have to pay a higher amount e.g. 5 dollars. Another example is to, as the one described in conjunction with FIG. 4, namely that content/software providers offer new versions for e.g. free or with a small charge to users who have bought a previous version. Note however that for subscription based services, a subscription renewal will typically cost less than purchase of a new subscription.

Figure 7:
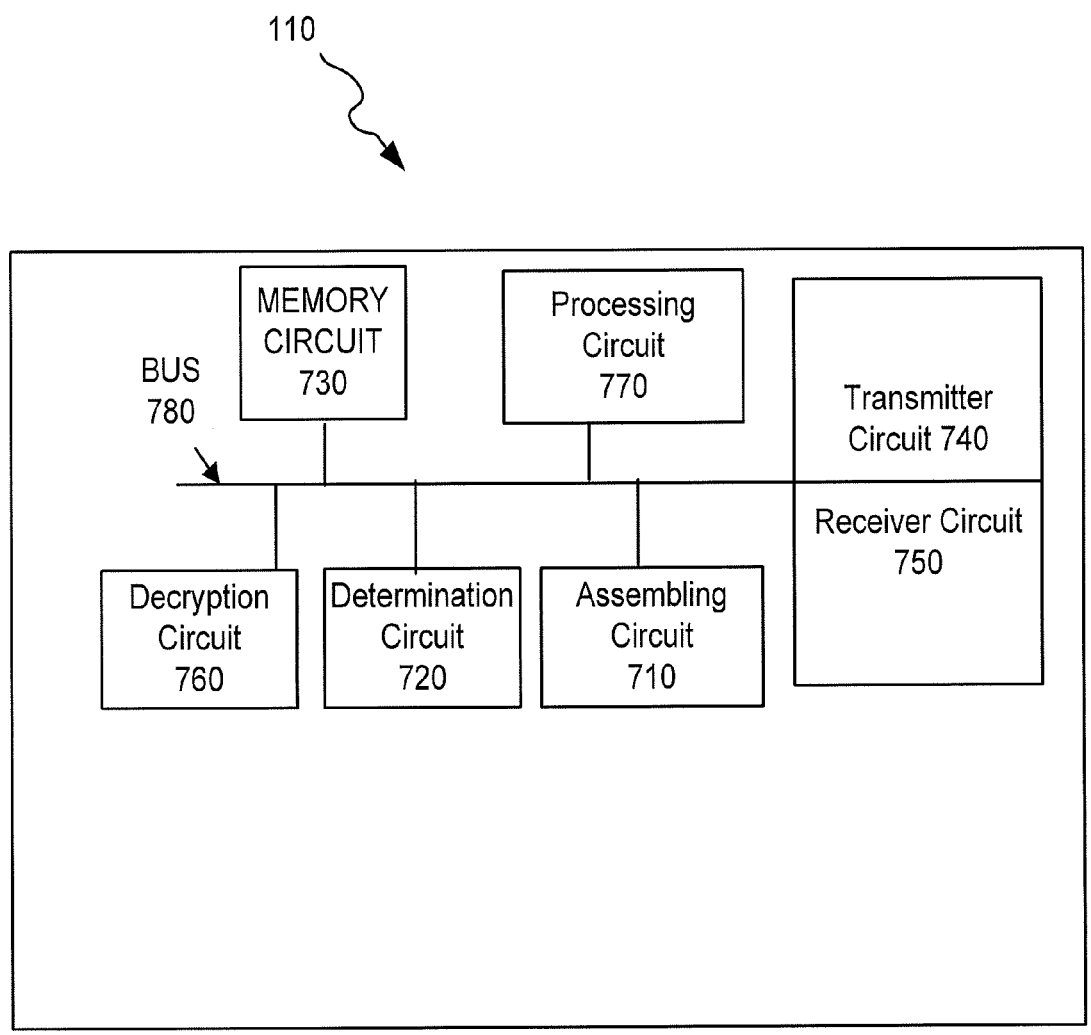
FIG. 7 is a block diagram illustrating a client device according to an exemplary embodiment of the present invention.
Figure 8:
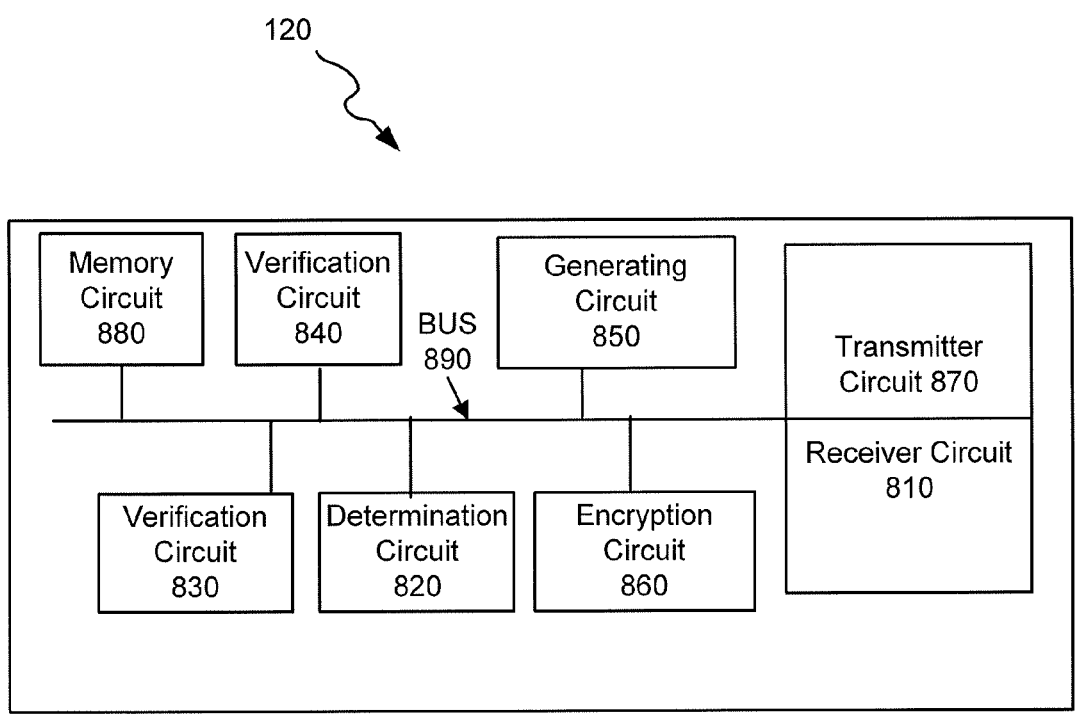
FIG. 8 is a block diagram illustrating a server of a content provider according to an exemplary embodiment of the present invention.

Hitherto, exemplary embodiments of the present invention have been described in relation to different exemplary scenarios involving a client device, a server of a content provider, and the interaction between them for the purpose of enabling at least one user or client device to consume content provided by the content provider in e.g. a DRM system. In the following will be described, in relation to FIG. 5 and FIG. 6 respectively, the main method steps performed by the client device and by the server respectively in accordance with previously described embodiments of the present invention. Following FIG. 5 and FIG. 6, a block diagrams will be described in conjunction with FIGS. 7 and 8 respectively where FIG. 7 is a block diagram depicting a client device 110 and FIG. 8 is a block diagram depicting a server 120 of a content provider.

Figure 5:
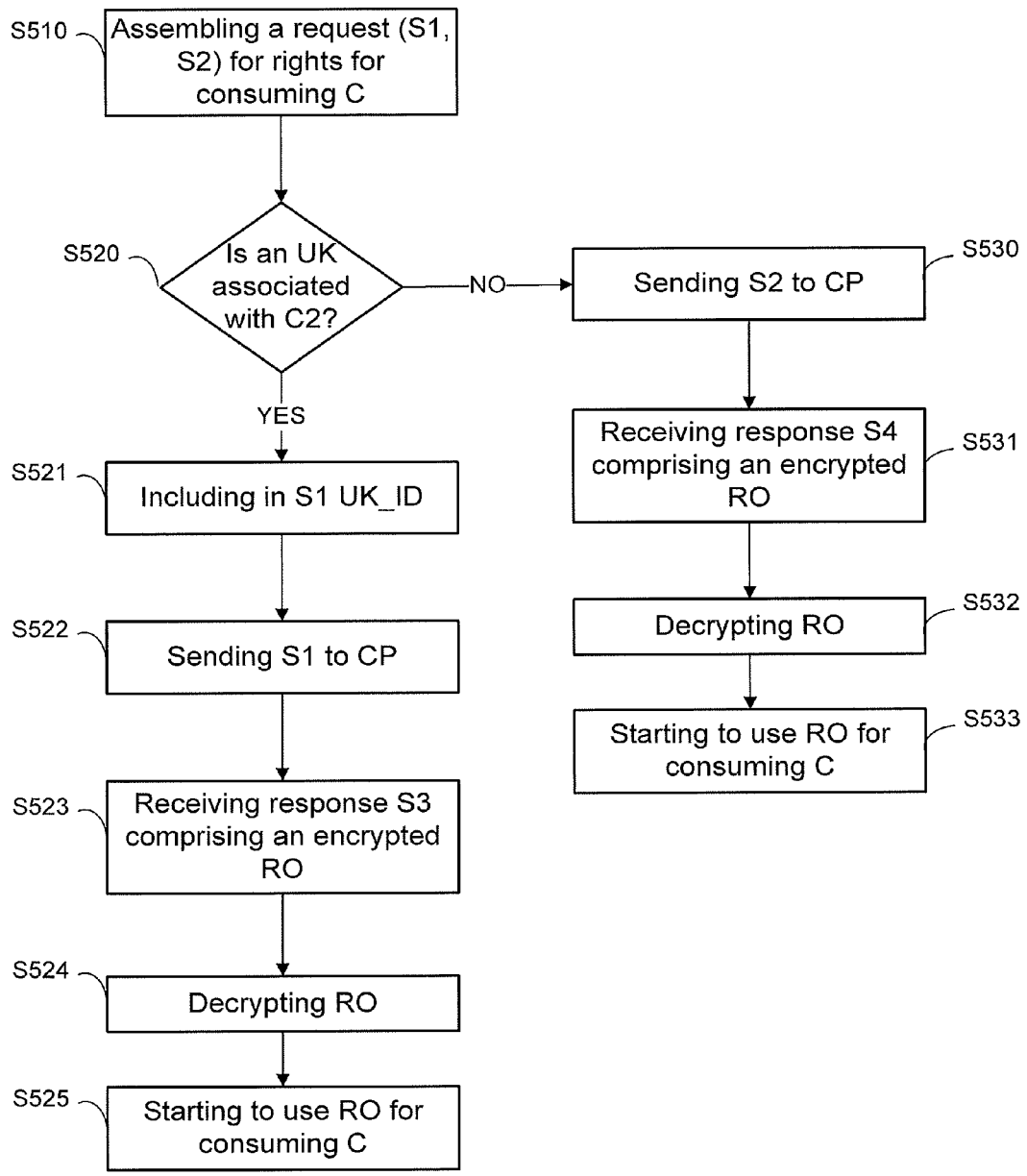
FIG. 5 is a flowchart illustrating main method steps performed by a client device according to exemplary embodiments of the present invention.

Referring to FIG. 5, there is depicted the main steps performed by the client device 110 in accordance with the embodiments of the present invention. The main steps performed by the client device comprise:

S510: Assembling, in at least one message, a request (S1, S2) for rights for consuming a content and indicating in the request (S1, S2) which content C to consume;
S520: determining if a UK associated with the content C is present in the client device (CD);
S521: including in the request message (S1), in the case the upgrade key is present in the client device (110), an identifier of the upgrade key (UK_ID) that is associated with the content;
S522: sending the request message (S1) including the UK_ID to the content provider (CP);
S523: receiving, from the content provider (CP), a response message (S3) comprising a rights object (RO) encrypted by using at least the upgrade key;
S524: decrypting the encrypted RO, and
S525: starting to use RO for consuming the content C.
S530: in case a UK is determined in step S520 to be absent in the client device CD, sending the assembled request (S2) to the content provider CP);
S531: receiving, from the content provider (CP), a response message (S4) comprising a RO encrypted using a client device/user's public key. The RO comprising an upgrade key (UK) that is associated with the content C;
S532: decrypting RO using the client device/user's private key; and
S533: starting to use RO for consuming the content C.

A detailed description on what is involved in the steps S510, S520-S525; S530-S533 and additional details have already been thoroughly described and are therefore not repeated unnecessarily.

Figure 6:
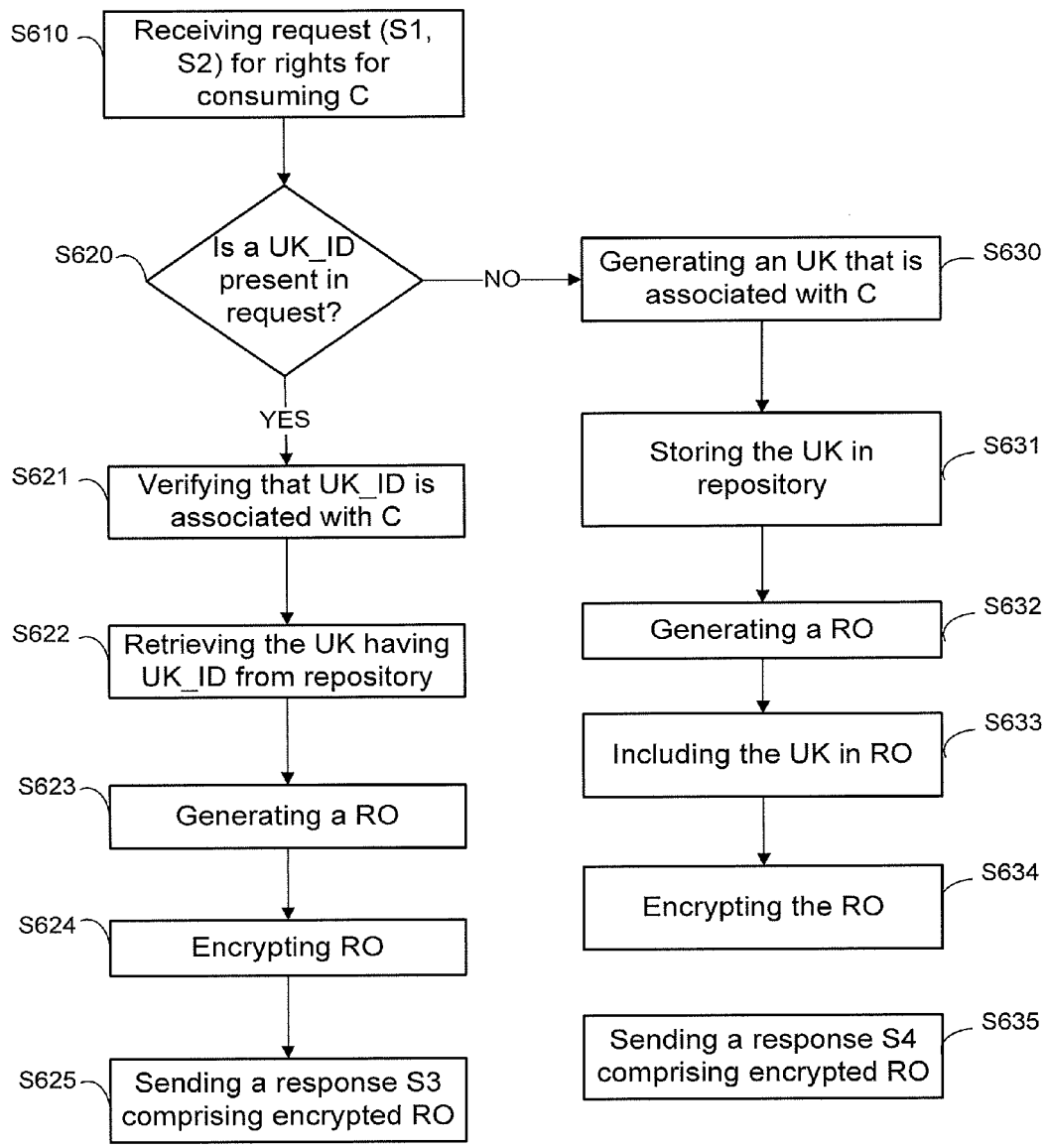
FIG. 6 is a flowchart illustrating main method steps performed by a server of a content provider according to exemplary embodiments of the present invention.

Referring to FIG. 6, there is depicted the main steps performed by the server 110 of the content provider (CP) in accordance with the embodiments of the present invention. The main steps performed by the server comprise:

S610: receiving, from a client device (CD), a request (S1, S2) for rights for consuming a content C, the request (S1, S2) indicating which content C to consume;
S620: determining if a UK_ID is present in the request associated with the content C;
S621 verifying, in the case the UK_ID is present in the request (S1), that the identifier of the upgrade key is identifying the upgrade key that is associated with the content C;
S622: retrieving the UK, having the identifier UK_ID, from a repository;
S623 generating a RO;
S624: encrypting the RO by using at least the retrieved UK; and
S625: sending, to the client device (CD), a response message (S3) comprising the encrypted (RO) for enabling CD to decrypt the RO and to start to use the RO for consuming the content C.
S630: in the case the UK_ID is absent in the request (S2), generating an UK that is associated with the content C;
S631: storing the generated UK in the repository;
S632: generating a RO;
S633: including the generated UK and an identifier of the generated upgrade key UK_ID in the RO;

S634: encrypting the RO by using at least a client device/user's (CD) public key;

S635: sending, to CD, a response message (S4) comprising the encrypted RO, for enabling CD to decrypt the RO and to start to use the RO for consuming the content A detailed description on what is involved in the steps S610, S620-S625; S630-S635 and additional details have already been thoroughly described and are therefore not repeated unnecessarily.

Referring to FIG. 7, there is illustrated a block diagram of exemplary components of a client device 110. The client device can be a PC, a laptop, a mobile phone, a PDA etc. As illustrated in FIG. 7, the client device 110 comprises, according to the embodiments of the present invention, an assembling circuit 710, to assemble in at least one message, a request (S1, S2) for rights for consuming a content C and is further configured to indicate in the request (S1, S2) which content C to consume. The client device 110 further comprises a determination circuit 720 configured to determine if an upgrade key (UK) associated with the content is present in the client device 110. The assembling circuit 710 is further adapted to include in the request message (S1), an identifier of the UK, UK_ID that is associated with the content C, in the case the UK is present in the client device 110. As shown, the client device 110 comprises a memory circuit/unit 730 for storing or hosting the UK and the UK_ID etc. The client device 110 further comprises a transmitter circuit 740 configured to send the request message (S1) comprising the UK_ID, to the content provider (CP), in the case the UK is present in the client device 110 or in the memory circuit of the device 110. A receiver circuit 750, also comprised in the client device 110, is configured to receive, from the CP, a response message (S3) comprising a rights object (RO), encrypted by using at least the UK, in the case the upgrade key is present in the client device 110. The client device 110 further comprises a decryption circuit 760 configured to decrypt the encrypted RO and a processing circuit 770 configured to use the RO for consuming the content. The transmitter circuit 740 is further configured to transmit the assembled request (S2) to the content provider, in the case the UK is absent in the client device (110; and the receiver circuit 750 is further configured to receive, from the CP, a response message (S4) comprising a RO encrypted using a client device/user's public key, the received RO comprising an UK that is associated with the content C, in the case the upgrade key is absent in the client device 110. The decryption circuit 760 is further configured to decrypt the RO using the client device/user's private key, in the case the upgrade key is absent in the client device. The exemplary client device 110 further comprises a bus 780 to which the circuit/units of the client device 110 are connected as shown in FIG. 7. The additional functions of the client device 110 have already been described and are not repeated again. It should however be noted that the client device 110 may comprise additional circuit/units not explicitly shown in FIG. 7. Examples of such additional circuits/units include e.g. at least one antenna, a transceiver with integrated transmit and receiver circuits/units, input device(s) circuit/unit, output device(s) circuit/unit, one or several interfaces etc.

Referring to FIG. 8, there is illustrated a block diagram of exemplary components of a server 110 of a content provider. As illustrated the server 110 comprises, according to the embodiments of the present invention: a receiver circuit 810 that is configured to receive a request (S1, S2) indicating which content C to consume; a determination circuit 820 configured to determine if an identifier of an upgrade key (UK_ID) is present in the request (S1, S2); a verification circuit 830 adapted to verify that the UK_ID is associated with the content C, in the case the UK_ID is present in the request (S1); a retrieving circuit 840 configured to retrieve the upgrade key (UK) from a repository in the case UK_ID is present in the request (S1). The repository can be an integral part of the server 120 or can be connected to the server by means of an interface (not shown) or can be located remotely and accessed securely by the server 120 via any suitable access network or accessed from the Internet. In other words, the exemplary embodiments of the present invention are not restricted to where the repository is located in the system. Referring back to FIG. 8, the server 120 further comprises a generating circuit 850 that is configured to generate a rights object (RO). The server 120 further comprises an encryption circuit 860 configured to encrypt the generated rights object, RO, by using at least the retrieved UK. The server 120 further comprises a transmitter circuit 870 configured to send, to the at least one client device a response message (S3) comprising the encrypted RO, for enabling the client device(s) to decrypt the RO and to start to use the RO for consuming the content C. According to an embodiment of the present invention the generating circuit 850 is configured to generate an UK that is associated with the content, in the case an UK_ID is absent in the request (S2) or a new (updated) UK is needed for future upgrades. The server 120 is further configured to store the generated UK in the repository. The server 120 further comprises a memory circuit/unit 880. The encryption circuit 860 is further configured to encrypt RO by using at least a client device/user's public key; and the transmitter circuit 870 is further configured to send, to the at least one client device a response message (S4) comprising the encrypted RO for enabling the client device(s) to decrypt the RO and to start to use the RO for consuming the content C. The exemplary server 120 further comprises a bus 890 to which the circuit/units of the server are connected as shown in FIG. 7. The additional functions of the server 120 have already been described and are not repeated again. It should however be noted that the server 120 may comprise additional circuit/units not explicitly shown in FIG. 8. Examples of such additional circuits/units include e.g. at least antenna, a transceiver comprising a transmitter and a receiver circuit/unit, input device(s) circuit/unit, output device(s) circuit/unit, one or several interfaces etc.

The present invention and its exemplary embodiments can be realized in many ways. For example, one embodiment of the present invention includes a computer-readable medium or a computer program product having program instructions stored thereon that are executable by a computer of the client device and/or server of the content provider to perform the method steps of the exemplary embodiments of the present invention as previously described.

While the invention has been described in terms of several preferred embodiments, it is contemplated that alternatives, modifications, permutations and equivalents thereof will become apparent to those skilled in the art upon reading of the specifications and upon study of the drawings. It is therefore intended that the following appended claims include such alternatives, modifications, permutations and equivalents as fall within the scope of the present invention.

The invention claimed is:

1. A method, in a client device, for enabling at least one user to consume content provided by a content provider, the content provider capable of operating in a digital rights management system; the method comprising:
assembling, in at least one message, a request for rights for consuming content and indicating in the request which content;

determining if an upgrade key associated with the content is present in the client device;
in response to determining that the upgrade key is present in the client device:
including in the request an identifier of an upgrade key that is associated with the content;
sending the request, including the identifier of the upgrade key, to the content provider;
receiving, from the content provider, a response comprising a rights object encrypted by using at least the upgrade key;
decrypting the encrypted rights object using the upgrade key; and
starting to use the rights object for consuming the content;
wherein the upgrade key is a group upgrade key;
wherein the at least one user belongs to a group to which the group upgrade key is associated.

2. The method according to claim 1 further comprising, in response to determining that the upgrade key is absent from the client device:
sending the request to the content provider;
receiving, from the content provider, a response comprising a rights object encrypted using a public key of the client device or a user thereof, the received rights object comprising an upgrade key that is associated with the content;
decrypting the rights object using a corresponding private key of the client device or user thereof; and
starting to use the rights object for consuming the content.

3. The method of claim 1:
wherein the received response comprises the rights object encrypted by the upgrade key and a public key of the client device or user thereof;
wherein the decrypting the rights object comprises decrypting the rights object using both the upgrade key and a corresponding private key of the client device or user thereof.

4. The method of claim 1 wherein the decrypting comprises decrypting the encrypted rights object by using the upgrade key.

5. The method of claim 1 wherein the rights object includes an updated upgrade key.

6. A method, in a server of a content provider, for enabling at least one user to consume content provided by the content provider, the content provider capable of operating in a digital rights management system; the method comprising:
receiving, from a client device, a request for rights for consuming a content, the request indicating which content to consume;
determining if an identifier of an upgrade key is present in the request;
in response to determining that the identifier of the upgrade key is present in the request:
verifying that the identifier of the upgrade key identifies the upgrade key that is associated with the content;
retrieving the upgrade key from a repository;
generating a rights object;
encrypting the rights object by using at least the retrieved upgrade key; and
sending, to the client device, a response comprising the encrypted rights object for enabling the client device to decrypt the rights object using the upgrade key and to start to use the rights object for consuming the content;
wherein the upgrade key is a group upgrade key;
wherein the at least one user belongs to a group to which the group upgrade key is associated.

7. The method according to claim 6, wherein the encrypting the rights object by using at least the retrieved upgrade key comprises encrypting the rights object using a public key of the client device or a user thereof.

8. The method of claim 6 wherein the generating the rights object comprises including an updated upgrade key in the rights object.

9. The method of claim 6, wherein, in response to determining that the identifier for the upgrade key is absent from the request:
generating an upgrade key that is associated with the content;
storing the generated upgrade key in a repository;
generating a rights object;
including, in the rights object, both the generated upgrade key and an identifier of the generated upgrade key;
encrypting the rights object by using a public key of the client device or a user thereof;
sending a response comprising the encrypted rights object to the client device.

10. The method of claim 6 further comprising, in response to determining that the identifier of the upgrade key is absent from the request:
determining if there is a group upgrade key associated with the content and stored in a repository;
in response to determining that there is a group upgrade key associated with the content;
generating a rights object;
including both the group upgrade key and an identifier of the group upgrade key in the rights object;
encrypting the rights object by using a public key of the client device or a user thereof;
sending a response to the client device, the response comprising the encrypted rights object for enabling the client device to decrypt the rights object and to start to use the rights object for consuming the content.

11. The method according to claim 10 wherein the rights object includes an updated group upgrade key.

12. A computer program product stored in a non-transitory computer readable medium for enabling at least one user to consume content provided by a content provider, the content provider capable of operating in a digital rights management system; the computer program product comprising software instructions which, when run on a computer, causes the computer to:
assemble, in at least one message, a request for rights for consuming content and indicating in the request which content;
determine if an upgrade key associated with the content is present in the client device;
in response to determining that the upgrade key is present in the client device:
include in the request an identifier of an upgrade key that is associated with the content;
send the request, including the identifier of the upgrade key, to the content provider;
receive, from the content provider, a response comprising a rights object encrypted by using at least the upgrade key;
decrypt the encrypted rights object using the upgrade key; and
start using the rights object for consuming the content;
wherein the upgrade key is a group upgrade key;

wherein the at least one user belongs to a group to which the group upgrade key is associated.

13. A computer program product stored in a non-transitory computer readable medium for enabling at least one user to consume content provided by a content provider, the content provider capable of operating in a digital rights management system; the computer program product comprising software instructions which, when run on a server of a content provider, causes the server to:
- receive, from a client device, a request for rights for consuming a content, the request indicating which content to consume;
- determine if an identifier of an upgrade key is present in the request;
- in response to determining that the identifier of the upgrade key is present in the request:
  - verify that the identifier of the upgrade key identifies the upgrade key that is associated with the content;
  - retrieve the upgrade key from a repository;
  - generate a rights object;
  - encrypt the rights object by using at least the retrieved upgrade key; and
  - send, to the client device, a response comprising the encrypted rights object for enabling the client device to decrypt the rights object using the upgrade key and to start to use the rights object for consuming the content;
- wherein the upgrade key is a group upgrade key;
- wherein the at least one user belongs to a group to which the group upgrade key is associated.

14. A client device, for enabling at least one user to consume content provided by a content provider, the content provider capable of operating in a digital rights management system; the client device comprising:
- an assembling circuit configured to:
  - assemble, in at least one message, a request for rights for consuming a content;
  - indicate in the request which content to consume;
- a determination circuit configured to determine if an upgrade key associated with the content is present in the client device;
- wherein the assembling circuit is configured to, in response to determining that the upgrade key is present in the client device, include an identifier of an upgrade key that is associated with the content in the request;
- a transmitter circuit configured to, in response to determining that the upgrade key is present in the client device, send the request comprising the identifier of the upgrade key to the content provider;
- a receiver circuit configured to, in response to determining that the upgrade key is present in the client device, receive, from the content provider, a response comprising a rights object encrypted by using at least the upgrade key;
- a decryption circuit configured to decrypt the encrypted rights object using the upgrade key; and
- a processing circuit configured to use the rights object for consuming the content;
- wherein the upgrade key is a group upgrade key;
- wherein the at least one user belongs to a group to which the group upgrade key is associated.

15. The client device of claim 14 wherein:
- the transmitter circuit is configured to, in response to determining that the upgrade key is absent from the client device, transmit the request to the content provider;
- the receiver circuit is configured to, in response to determining that the upgrade key is absent from the client device, receive, from the content provider, a response comprising a rights object encrypted using a public key of the client device or a user thereof, the received rights object comprising an upgrade key that is associated with the content;
- the decryption circuit is configured to, in response to determining that the upgrade key is absent from the client device, decrypt the rights object using a private key of the client device or the user thereof.

16. The client device according to claim 14:
- wherein the rights object is encrypted using both the upgrade key and a public key of the client device or the user;
- wherein the decryption circuit is configured to decrypt the rights object using both the upgrade key and a private key of the client device or user.

17. The client device of claim 14 wherein the decryption circuit is configured to decrypt the encrypted rights object by using the upgrade key.

18. The client device of claim 14 wherein the rights object comprises an updated upgrade key.

19. A server of a content provider, for enabling at least one user to consume content provided by the content provider capable in operating in a digital rights management system; the server comprising:
- a receiver circuit configured to receive, from a client device, a request for rights for consuming a content, the request indicating which content to consume;
- a determination circuit configured to determine if an identifier of an upgrade key is associated with the content;
- a verification circuit adapted to, in response to determining that the identifier of the upgrade key is present in the request, verify the identifier of the upgrade key is identifying the upgrade key that is associated with the content;
- a retrieving circuit configured to, in response to determining that the identifier of the upgrade key is present in the request, retrieve the upgrade key from a repository;
- a generating circuit configured to generate a rights object;
- an encryption circuit configured to, in response to determining that the identifier of the upgrade key is present in the request, encrypt the rights object by using at least the retrieved upgrade key; and
- a transmitter circuit configured to send a response comprising the encrypted rights object to the client device, in order to enable the client device to decrypt the rights object using the upgrade key;
- wherein the upgrade key is a group upgrade key;
- wherein the at least one user belongs to a group to which the group upgrade key is associated.

20. The server of claim 19 wherein the encryption circuit configured to encrypt the rights object by using at least the retrieved upgrade key is further configured to encrypt the rights object using a public key of the client device or a user thereof.

21. The server of claim 19 wherein the rights object comprises an updated upgrade key.

22. The server of claim 19 wherein:
- the generating circuit is configured to, in response to the identifier of the upgrade key being absent from the request, generate an upgrade key that is associated with the content;
- the server is further configured to, in response to the identifier of the upgrade key being absent from the request, store the generated upgrade key in a repository;
- the generating circuit is further configured to, in response to the identifier of the upgrade key being absent from the request, generate a rights object and to include the generated upgrade key and an identifier of the generated upgrade key in the rights object;

the encryption circuit is further configured to encrypt the rights object by using a public key of the client device or a user thereof.

23. The server of claim 19 wherein:

the determination circuit is configured to, in response to the identifier of the upgrade key being absent from the request, determine if there is a group upgrade key associated with the content in a repository;

the generating circuit is configured to, in response to determining that there is a group upgrade key in the repository, generate a rights object and to include the group upgrade key and an identifier of the group upgrade key in the rights object;

the encryption circuit is configured to encrypt the generated rights object by using a public key of the client device or a user thereof; and the transmitter circuit is configured to send a response comprising the encrypted rights object to the client device.

24. The server of claim 23 wherein the rights object comprises an updated group upgrade key.

* * * * *

UNITED STATES PATENT AND TRADEMARK OFFICE
CERTIFICATE OF CORRECTION

PATENT NO. : 8,806,208 B2  
APPLICATION NO. : 13/577756  
DATED : August 12, 2014  
INVENTOR(S) : Cheng et al.

Page 1 of 1

It is certified that error appears in the above-identified patent and that said Letters Patent is hereby corrected as shown below:

IN THE SPECIFICATION

In Column 9, Line 20, delete "client 120." and insert -- client device 110. --, therefor.

In Column 12, Line 41, delete "server 110" and insert -- server 120 --, therefor.

In Column 13, Line 60, delete "a server 110" and insert -- a server 120 --, therefor.

In Column 13, Line 61, delete "the server 110" and insert -- the server 120 --, therefor.

Signed and Sealed this  
Seventeenth Day of November, 2015

Michelle K. Lee  
*Director of the United States Patent and Trademark Office*